United States Patent
Schaareman et al.

(10) Patent No.: US 6,796,659 B2
(45) Date of Patent: Sep. 28, 2004

(54) PROJECTION DISPLAY DEVICE

(75) Inventors: Paulus Bartholomeus Johannes Schaareman, Eindhoven (NL); Theodoor Bastiaan Johannes Haddeman, Eindhoven (NL); Franciscus Guillaume Peter Sools, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/236,183

(22) Filed: Sep. 6, 2002

(65) Prior Publication Data
US 2003/0048424 A1 Mar. 13, 2003

(30) Foreign Application Priority Data
Sep. 11, 2001 (EP) .......................... 01203421

(51) Int. Cl.⁷ .................. G03B 21/18; G03B 21/26; G03B 21/14; G03B 5/22; G03B 5/24
(52) U.S. Cl. .................. 353/54; 353/84; 359/885; 359/886
(58) Field of Search ................ 353/54, 55, 56, 353/84, 60, 61, 33; 359/885, 886; 252/586; 349/106; 430/7, 517

(56) References Cited

U.S. PATENT DOCUMENTS

| | | | | |
|---|---|---|---|---|
| 3,586,417 A | * | 6/1971 | Fields | 359/289 |
| 3,914,010 A | * | 10/1975 | Zeller | 359/358 |
| 4,495,549 A | * | 1/1985 | Carlson et al. | 362/470 |
| 4,944,125 A | * | 7/1990 | Ito | 52/171.3 |
| 5,808,795 A | * | 9/1998 | Shimomura et al. | 359/488 |
| 6,016,232 A | * | 1/2000 | Leib | 359/886 |
| 6,278,562 B1 | * | 8/2001 | Lovett | 359/886 |
| 6,602,447 B2 | * | 8/2003 | Danielson et al. | 252/589 |
| 2001/0009714 A1 | * | 7/2001 | Wheatley et al. | 428/212 |

FOREIGN PATENT DOCUMENTS

| | | | |
|---|---|---|---|
| DE | 301029 A7 | 9/1992 | G02B/5/24 |
| EP | 0511829 A2 | 4/1992 | H04N/9/31 |
| GB | 365740 | 1/1932 | |
| JP | 07294915 A | 10/1995 | G02F/1/1335 |
| JP | 09005734 A | 10/1997 | G02F/1/1335 |

* cited by examiner

Primary Examiner—Russell Adams
Assistant Examiner—Andrew Sever

(57) ABSTRACT

The invention relates to a projection display device having an illumination system comprising a light source and an optical system for providing an illumination beam. The projection display device is further provided with an image display system for modulating the illumination beam with image information and projecting an image on a screen. In order to filter ultra-violet and infra-red radiation from the light source, a filter means is present which transmit visible light. Cooling means comprising a cooling liquid are present for cooling the filter means. In the projection display device, the filter means comprises the cooling liquid which contains a radiation-absorbent additive for absorbing the ultra-violet and infra-red radiation.

2 Claims, 3 Drawing Sheets

PROJECTION DISPLAY DEVICE

The invention relates to a projection display device comprising an illumination system having a light source and an optical system for providing an illumination beam, an image display system for modulating the illumination beam with image information and for projecting an image on a screen, filter means for transmitting a first portion of radiation from the light source having a first wavelength range in the visible area to the optical system, and for absorbing a second portion of the radiation from the light source, the second portion having a second wavelength range outside the visible area, and cooling means comprising a liquid for cooling the filter means.

Projection display devices may be used in both rear and front image projecting systems. In a rear projection system, the projection display device projects an image representing television or datagraphic information on the rear side of a diffusing transparent screen, which front side is directed to a viewing audience. In a front projecting system, the projection display device projects an image representing television or datagraphic information on the front side of a reflecting screen, which front side is directed to the viewing audience.

Such a projection display device is known from Japanese Kokai 09-005734. The known projection display device comprises an illumination system for providing an illumination beam and an image display system for modulating an illumination beam to be supplied by the illumination system with image information and projecting an image on a screen. The illumination system comprises a light source and an optical system for forming the illumination beam. The light source may be an ultra-high pressure discharge lamp. Besides visible radiation this kind of lamp produces, also ultra-violet radiation with wavelengths mainly in the range between 250 and 425 nm and infra-red radiation with wavelengths mainly in the range between 800 and 950 nm. In order to filter the unwanted portions of the radiation from the light source, such as the ultra-violet and infra-red radiation, an ultra-violet absorbent filter and an infra-red absorbent filter may be positioned in the light path between the light source and the optical system. In order to keep the ultra-violet and infra-red absorbent filters below their maximum operating temperature, a cooling container comprising two parallel plates containing a cooling liquid is present, which container comprises a transparent portion for a wavelength range in the visible area for passing the illumination beam. This cooling means is positioned in the illumination beam and attached to the ultra-violet absorbent filter or the infra-red absorbent filter to transport the heat generated in the ultra-violet absorbent filters or the infra-red filter, respectively, to the environment of the projection display device.

A disadvantage of the projection display device is that the thermal conductance between the ultra-violet absorbent filter and the container is limited and the operating temperature of the filters can be exceeded, which affects the cut-off wavelengths and the lifetime of the filters.

It is an object of the invention to provide a projection display device having an extended lifetime. This object can be achieved by the projection display device in accordance with the invention, and is characterized in that the filter means comprises the liquid which contains a radiation-absorbent additive for absorbing the second range of wavelengths. This invention is based on the recognition that the heat generated by the absorption of the radiation can be directly transported to the environment by convection in the liquid whereas in the conventional system the heat transport is limited by conduction in the ultra-violet or infra-red absorbent materials. In the new projection display device, heat transport via convection is more efficient so that the filter means can be operated at a lower operating temperature, which extends the lifetime.

A further advantage is that the stability of the cut-off wavelength of the filter means is improved because of a temperature dependency of the cut-off wavelength. A more constant temperature provides a more stable cut-off wavelength of the filter means. Furthermore, the improved cooling may allow a more compact design of the projection display device.

A particularly advantageous embodiment of the projection display according to the invention is characterized in that the liquid comprises a solvent and the radiation-absorbent additive is a substance which is soluble in the solvent for absorbing radiation having the second range of wavelengths. The second range of wavelengths may be an ultra-violet range between 250 and 425 nm or an infra-red range between 800 and 950 nm.

A further embodiment of the projection display device is characterized in that the solvent is water and the radiation-absorbent substance is one of the group of benzophenephosphates and benzotriazolephosphates. Also benzophenonesulphates or benzotriazolesulphates can be used as radiation-absorbent substances, both of which are also soluble in water. These radiation-absorbent substances mainly absorb ultra-violet radiation in a range between 350 and 425 nm.

A further embodiment of the projection display device is characterized in that the solvent is an organic liquid and the radiation-absorbent additive is one of the group of benzophenones and benzotriazoles. This radiation-absorbent substance also absorbs ultraviolet radiation in a range between 250 and 425 nm.

A further embodiment of the projection display device is characterized in that the solvent is water and the radiation-absorbent substance is one of the group of carbocyanines. This radiation-absorbent substance absorbs mainly infra-red radiation in a wavelength range between 800 and 950 nm.

These and other aspects of the invention are apparent from and will be elucidated with reference to the embodiments described hereinafter.

Figure 1:
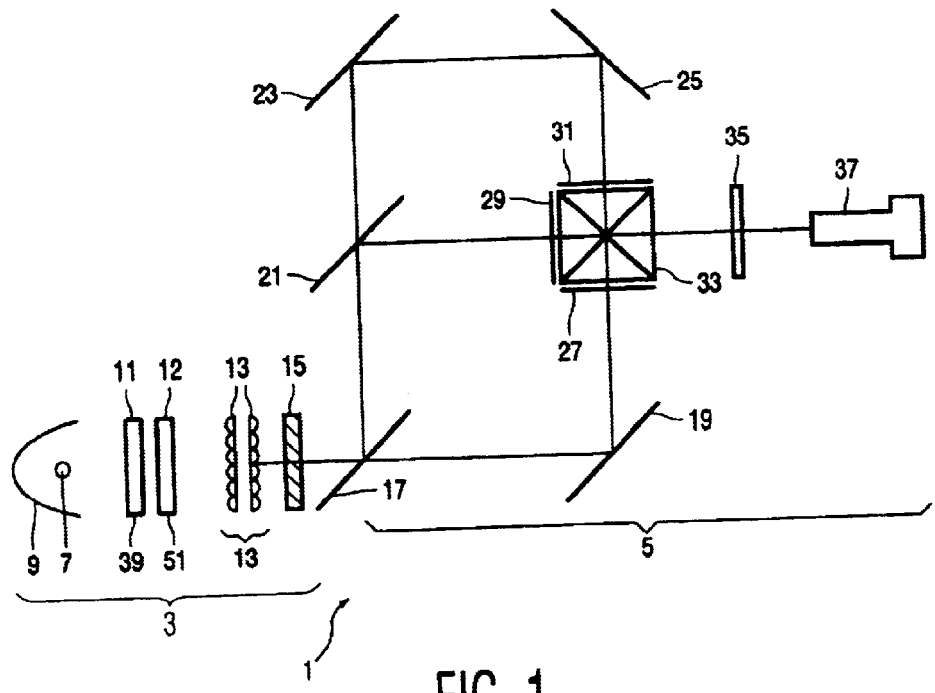
FIG. 1 shows an example of a projection display device having a filter means.

FIG. 1 shows an example of a first image projection device 1 comprising an illumination system 3 for supplying an illumination beam and a conventional image display system 5 for modulating the illumination beam. The illumination system 3 comprises a light source 7, a reflector 9, an ultraviolet absorbent filter 11, a condenser lens 13 and a polarization converter 15. The reflector 9 ensures that the greater part of the light emitted by the light source 7 in a direction away from the illumination system as yet reaches the image display system 5. The illumination beam generated by the illumination system 3 is incident on the image display system 5. The image display system 5 comprises dichroic mirrors, 17 and 21, mirrors 19,23, and 25, a dichroic cross 33, and transmissive display panels 27,29, and 31, for example transmissive liquid crystal display panels, an analyser 35 and a projection lens 37.

In operation, white light from the light source 7 and the reflector 9 is coupled in the display system 5 via the ultra-violet absorbent filter 11, the condenser plates 13 and the polarisation converting system 15. The condenser plates 13 provide a homogeneous illumination beam. The polarisation conversion system 15 provides an illumination beam with a single linear polarisation direction from an incoming non-polarised illumination beam. The ultra-violet absorbent filter absorbs radiation in the range from 250 to 425 nm in the illumination beam.

Furthermore, an infra-red absorbent filter 12 may be present between the light source 7 and the condenser plates 13 for absorbing radiation from the light source in the range between 800 and 950 nm. In the display system 5, the first dichroic mirror 17 separates the red sub-beam from the white illumination beam. The mirror 19 directs the red sub-beam towards a first liquid crystal display panel 31. The first dichroic mirror 17 directs the blue and green sub-beams to a second dichroic mirror 21. The second dichroic mirror 21 directs the green portion to the second liquid crystal display panel 29 and the blue portion is transmitted to the third liquid crystal display panel 31 via the mirrors 23,25. The liquid crystal display panels 27,29,31 modulate the red, green and blue portions in correspondence with the provided image information. The dichroic cross 33 combines the red, green and blue sub-beams in a single modulated light beam and directs the modulated light beam via an analyser 35 to the projection lens. The projection lens 37 images the modulated light beam on a projection screen (not shown).

The light source 7 may be an ultra-high pressure discharge lamp such as UHP-100 as supplied by Philips Electronics. Besides radiation in the visible wavelength range, this UHP lamp produces also radiation in the ultra-violet part and the infra-red part of the electromagnetic spectrum.

Figure 2:
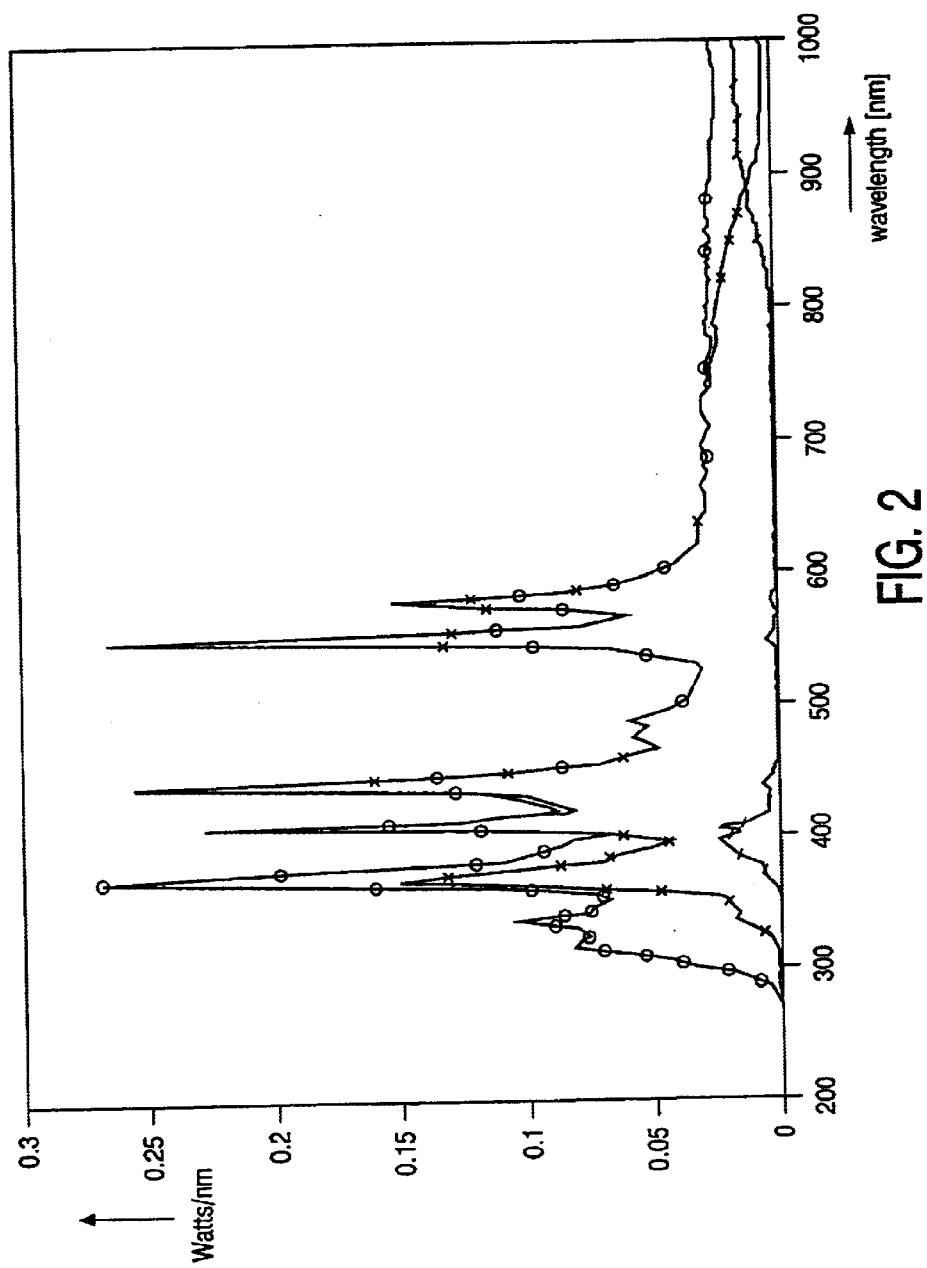
FIG. 2 shows a diagram of the electromagnetic radiation spectrum of an UHP lamp.

FIG. 2 shows a diagram of the spectrum radiated by a 100 watt UHP lamp.

The diagram shows three lines, a first line, marked 0-0-0-0, indicates the output of the lamp in watts/nm for the burner or central portion of the lamp where the actual discharge takes place. A second line, marked x-x-x-x- indicates the output of the UHP lamp, measured in front of the reflector and a third line marked ------ indicates the output of the lamp measured behind the reflector.

The ultra-violet portion of the light from the UHP lamp 7 may damage the polarisation conversion system 15, the liquid crystal display panels 29,31,33 and polarizer foils that may be present in the analyzer 35. Therefore, the ultra-violet filter 11 is positioned between the UHP lamp 7 and the polarisation conversion system 15. The ultra-violet absorbent filter 11 absorbs radiation in the range between 250 and 425 nm from the radiation of the UHP lamp.

The infra-red portion of the radiation of the UHP lamp heats the polarisation conversion system 15 and the liquid crystal display panels 27,29,31 and, consequently, the polarisation conversion system 15 and the liquid crystal displays 27,29,31 may require additional cooling. In order to prevent unnecessary heating of the polarisation conversion system 15 or the liquid crystal display panels 27,29,31, the infra-red absorbent filter 12 is placed between the UHP-lamp 5 and the condenser plates 13. The infra-red absorbent filter 12 absorbs radiation in the range from 800 to 950 nm from the UHP lamp 5 and reduces the heating of the polarisation conversion system 15 and the liquid crystal display panels 29,31,33. The lower operation temperature extends the lifetime of these components and hence the lifetime of the projection display device. In order to improve the cooling of the ultra-violet absorbent filter 11 as well as the infrared absorbent filter 12, these filters can be attached to a container with a cooling liquid. A portion of the container and the cooling liquid is transparent for transmitting a portion of the radiation from the UHP lamp 7 between 425 and 800 nm. The cooling container 39 may be provided with cooling fins (not shown) to transport heat from the cooling container 39 to the environment.

In order to further improve the cooling of the ultra-violet and infra-red filters 11,12, both filters are provided as a container having a transparent portion for transmitting radiation to the condenser plates 13 and comprising a liquid transparent portion for radiation in the visible range between 425 and 800 nm, wherein the liquid comprises an ultra-violet absorbent substance. The infra-red filter 12 also comprises a container having a transparent portion for transmitting the radiation in the visible range between 425 and 800 nm to the condenser plates 13, wherein the liquid comprises a liquid transparent to radiation in the visible range between 425 and 800 nm, wherein the liquid comprises an infra-red absorbent substance.

Figure 3:
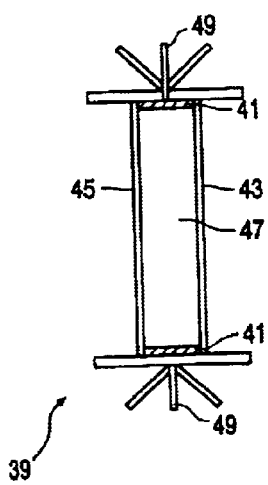
FIG. 3 shows an example of a container containing the filter liquid.

FIG. 3 is a cross-section of an ultra-violet absorbent filter 11. The ultra-violet absorbent filter 11 comprises the container 39 having a rectangular frame 41 provided with two transparent surfaces 43,45, for example, glass or polymethylmetacrylate. The container 39 contains a solvent 47 and an ultra-violet absorbing substance which is soluble in the solvent. Furthermore, cooling fins 49 can be connected to the frame 41. The solvent may be water or an organic solvent. Examples of water-soluble substances are: benzophenonesphosphates, benzotriazolephosphates, benzophenonessulphates, benzotriazolesulphates.

A practical applicable substance may be Eusolex 232 (phenylbenzimidazole sulfonic acid) which is a water-soluble UV-B filter, and can be obtained from Merck.

Examples of oil-soluble substances are benzophenones and benzotriazoles.

A practical applicable substance may be an oil-soluble UV-A filter, for example, Eusolex 9020 (butyl metoxydibenzoylmethane), Eusolex 6007 (Octyldimethyl PABA) or an oil-soluble UV-B filter Eusolex 2292 (Octyl Methoxycinnamate). All of these substance can be obtained from Merck.

Figure 4:
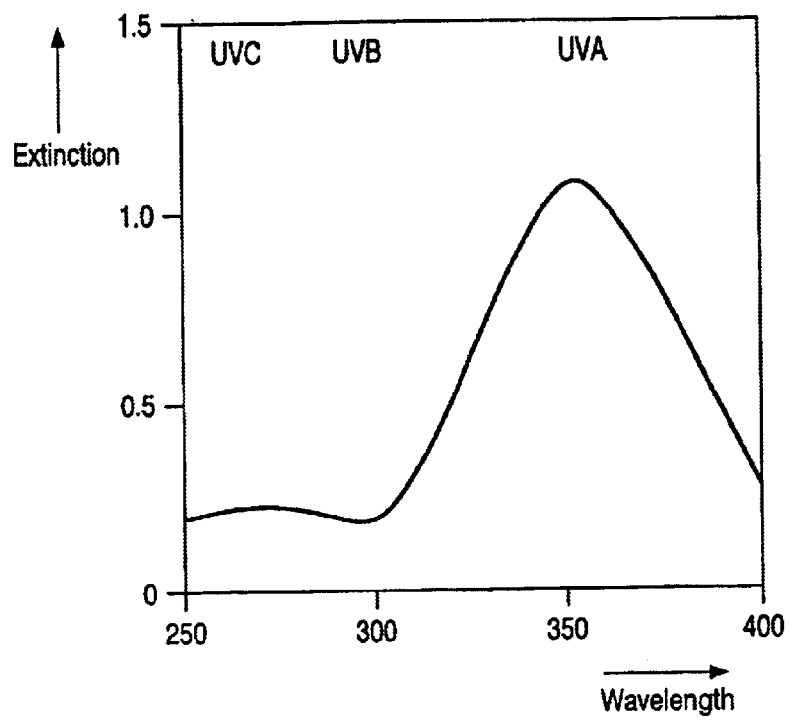
FIG. 4 shows a diagram of the ultra-violet absorption-versus-wavelength of a solution of Eusolex 9020 in an organic solvent.

FIG. 4 shows a diagram of the absorption efficacy-versus-wavelength characteristic of Eusolex 9020 solved in oil. The characteristics show a high efficacy for the UV-B part of the spectrum between 300 and 425 nm.

The construction of the infra-red absorbent filter 12 is similar to the construction of the ultra-violet absorbent filter 11 as shown in FIG. 3. The container 39 contains a solvent and an infra-red absorbing substance which is soluble in the solvent. The solvent may be water or organic solvents. Water and other solvents like methanol, ethanol, glycol absorb radiation with a wavelength above 1000 nm. In order to absorb radiation with a wavelength in the range between 800 and 1000 nm, infra-red absorbing additives may be added, like carbo-cyanines. For example, IR1000, IR27, which can be ordered from Sigma-Aldrich, and indocyanine green (ICG).

Figure 5:
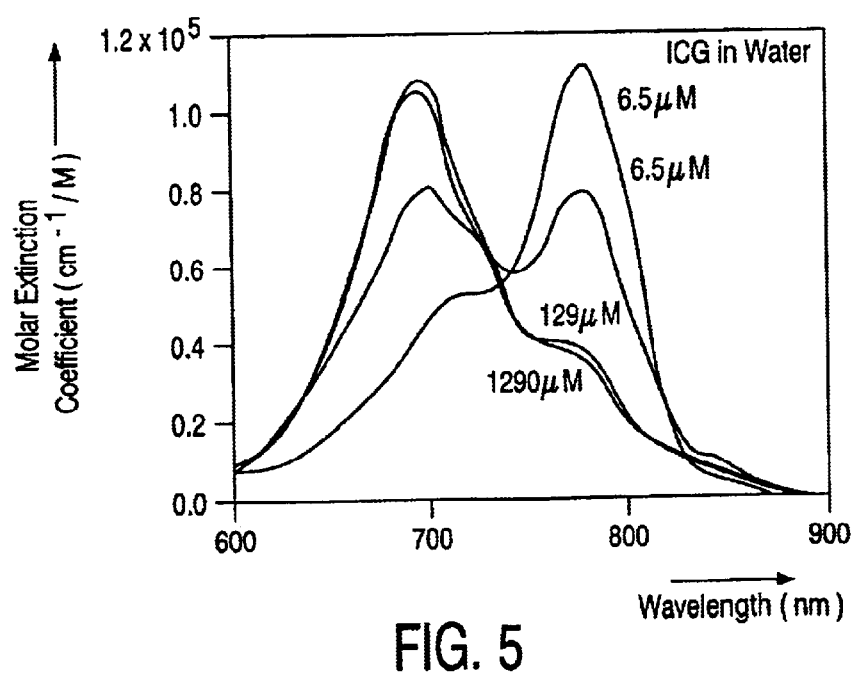
FIG. 5 shows a diagram of the infra-red absorption-versus-wavelength of a solution of indocyanine green in water.

FIG. 5. shows the absorbing characteristic of indocyanine green. ICG is a tricarbocyanine dye with a peak absorption at 800 nm and has little absorption in the visible range of the electromagnetic spectrum.

In operation, the dissipated heat will now be directly generated in the liquid 47 and is transported to the cooling fins 49 mainly by convection in the liquid 47 instead of conduction in the radiation absorbent material as in conventional ultra-violet and infra-red absorbent filters. This allows an efficient cooling of the ultra-violet and infra-red absorbent filters.

The invention is not limited to the above described projection system but may also be applied in scrolling color projection systems with a reflective display panel, for example, a liquid crystal on silicon (LCOS) panel.

What is claimed is:

1. A projection display device comprising:

an illumination system having a light source and an optical system for providing an illumination beam, an image display system for modulating the illumination beam with image information and projecting an image on a screen, filter means for transmitting a first portion of the radiation from the light source having a first wavelength range in the visible area to the optical system, and for absorbing a second portion of the radiation from the light source, the second portion having a second wavelength range outside the visible area and between 250 and 425 nm; and cooling means comprising a liquid for cooling the filter means, characterized in that the filter means comprises the liquid which contains a radiation-absorbent additive for absorbing the second wavelength range, wherein the liquid comprises water and the radiation-absorbent additive is a substance which is soluble in water and is selected from the group consisting of benzophenonephosphates and benzotriazolephosphates.

2. A projection display device comprising:

an illumination system having a light source and an optical system for providing an illumination beam, an image display system for modulating the illumination beam with image information and projecting an image on a screen, filter means for transmitting a first portion of the radiation from the light source having a first wavelength range in the visible area to the optical system, and for absorbing a second portion of the radiation from the light source, the second portion having a second wavelength range outside the visible area and between 250 and 425 nm; and cooling means comprising a liquid for cooling the filter means, characterized in that the filter means comprises the liquid which contains a radiation-absorbent additive for the absorbing the second wavelength range, wherein the liquid comprises water and the radiation-absorbent additive is a substance which is soluble in water and is selected from the group consisting of benzophenonesulsphates and benzotriazolesulsphates.

* * * * *